United States Patent
Barilovits et al.

(10) Patent No.: US 7,331,444 B2
(45) Date of Patent: Feb. 19, 2008

(54) CONVEYOR TRANSFER SYSTEM

(75) Inventors: Joseph Barilovits, Mauldin, SC (US); Thomas Barilovits, Simpsonville, SC (US)

(73) Assignee: Barvit Industrial, LLC, Simpsonville, SC (US)

( * ) Notice: Subject to any disclaimer, the term of this patent is extended or adjusted under 35 U.S.C. 154(b) by 0 days.

(21) Appl. No.: 11/489,201

(22) Filed: Jul. 19, 2006

(65) Prior Publication Data

US 2007/0017782 A1    Jan. 25, 2007

Related U.S. Application Data

(60) Provisional application No. 60/700,777, filed on Jul. 20, 2005.

(51) Int. Cl.
*B65G 15/14* (2006.01)

(52) U.S. Cl. .................................. 198/626.3; 198/626.5

(58) Field of Classification Search ................ 198/606, 198/626.1, 626.3, 626.4, 626.5, 626.6, 817
See application file for complete search history.

(56) References Cited

U.S. PATENT DOCUMENTS

| | | | | | |
|---|---|---|---|---|---|
| 3,179,237 | A | * | 4/1965 | Ninneman | 198/626.6 |
| 3,738,260 | A | * | 6/1973 | Navi et al. | 198/626.5 |
| 4,798,281 | A | * | 1/1989 | Egger | 198/626.5 |
| 5,492,216 | A | * | 2/1996 | McCoy et al. | 198/626.5 |
| 6,257,567 | B1 | * | 7/2001 | Hansmann et al. | 198/626.3 |
| 6,390,282 | B1 | * | 5/2002 | Ouellette | 198/626.5 |

* cited by examiner

*Primary Examiner*—James R. Bidwell

(57) ABSTRACT

A transfer system that laterally grips an open container at a position along a first belt upstream of a conveyor transfer and then transfers the container across the interface between belts before depositing the container on a second belt downstream of the conveyor transfer. The container is protected against lateral tipping and spillage during the transfer.

15 Claims, 2 Drawing Sheets

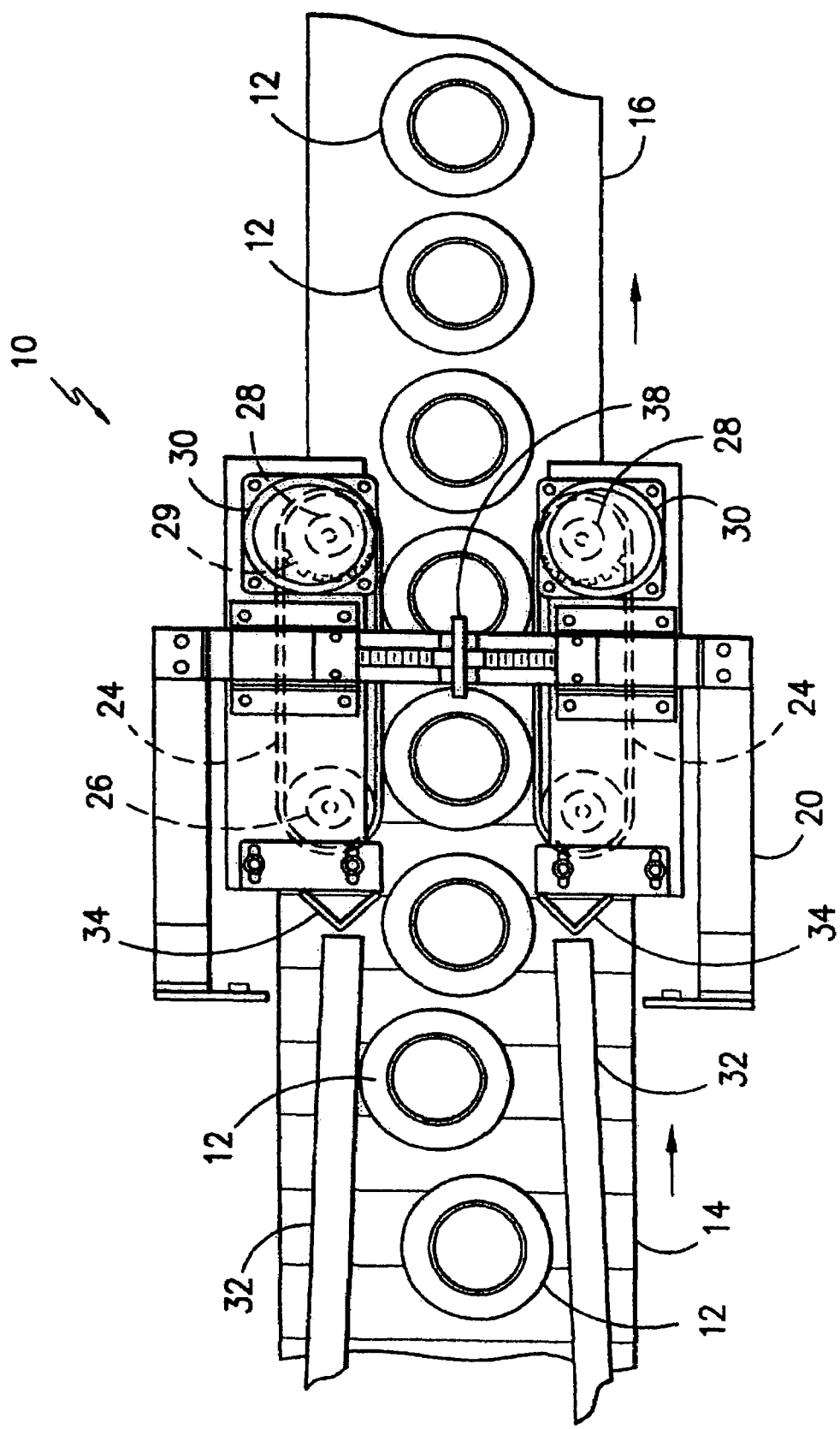
FIG. -1-

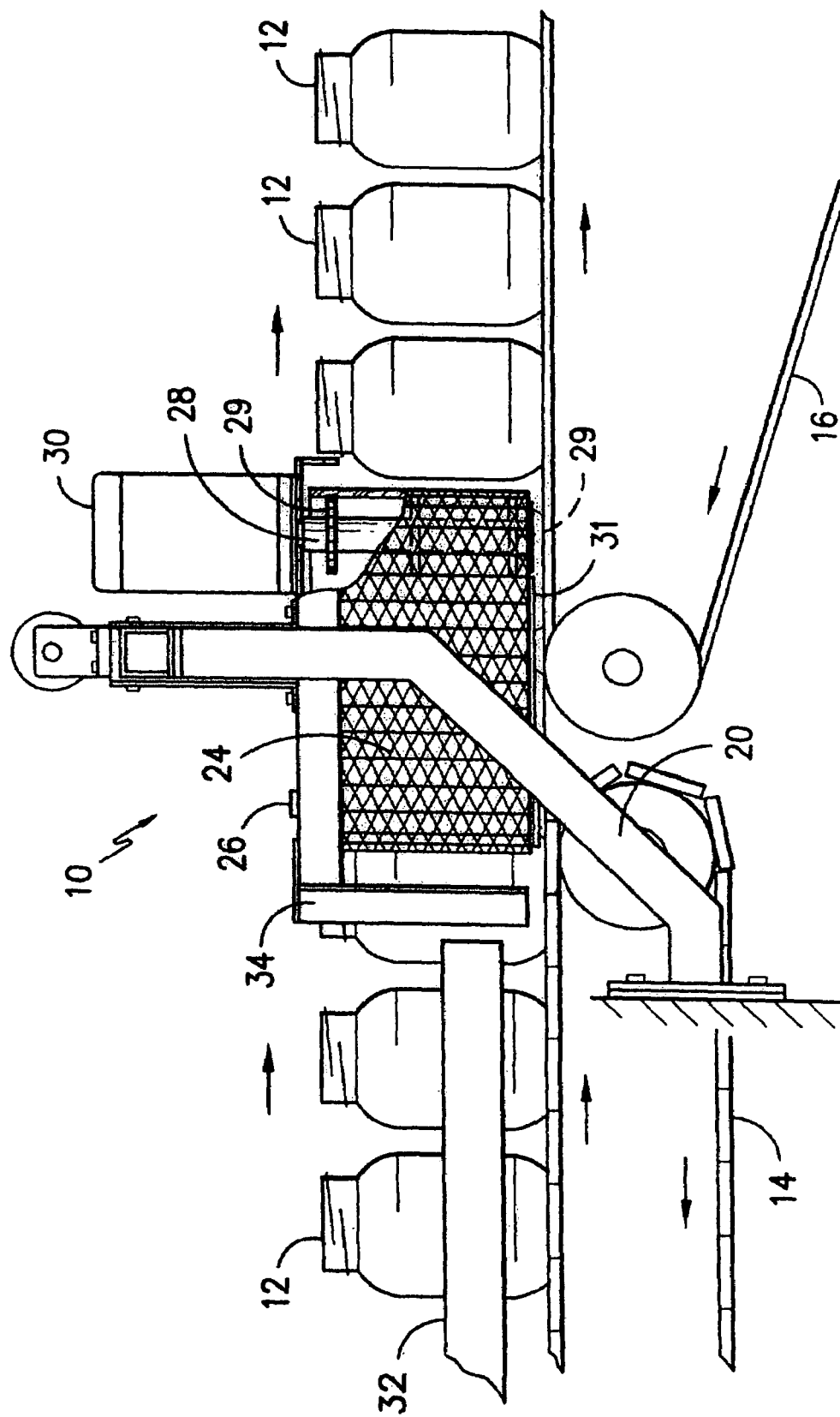

CONVEYOR TRANSFER SYSTEM

CROSS-REFERENCE TO RELATED APPLICATIONS

This application claims the benefit of U.S. provisional application No. 60/700,777 filed Jul. 20, 2005 the contents of which are hereby incorporated by reference in their entirety as if fully set forth herein.

TECHNICAL FIELD

This invention relates generally to conveyor systems and more particularly to a system and apparatus for transferring open containers including, but not limited to pill bottles and the like, across spaces between conveyors without spilling the contents of such containers.

BACKGROUND OF THE INVENTION

Conveyor belt systems are well known for transporting containers through various processing stages before final sealing of the container and delivery to the consumer. In a number of industries an empty container is filled with a product and then conveyed through various weighing and inspection stations prior to being sealed. A number of containers such as pill bottles and the like that are designed for ease of packaging and use by a consumer may be prone to tipping and spilling of their contents if they encounter a disturbance as they are conveyed. The possibility of spillage may be particularly acute when the containers are transported from one conveyor to another as they pass across the intersection between the belts. Even if the belts are perfectly level with one another along the plane of conveyance, an undesirable disturbance may still be encountered due to the fact that at the point of transfer the belts move below the plane of conveyance as they reverse direction thereby causing an interruption in the support surface for the containers. This interruption may cause one or more containers to turn over and spill their contents.

SUMMARY OF THE INVENTION

The present invention provides advantages and/or alternatives over the prior art by providing a transfer system that laterally grips an open container at a position along a first belt upstream of the conveyor transfer and then transfers the container across the interface between belts before depositing the container on a second belt downstream of the conveyor transfer. The container is protected against lateral tipping and spillage during the transfer. The container is gripped by laterally disposed chain members with a friction enhancing coating. The chain construction facilitates lateral gripping by conforming to the profile of the container during transfer. The system may be installed as a modular unit and is adjustable to containers of various diameters

BRIEF DESCRIPTION OF THE DRAWINGS

The accompanying drawings which are incorporated in and which constitute a part of this specification illustrate an exemplary embodiment of the present invention and together with the detailed description set forth below serve to explain the principles of the invention wherein:

FIG. 1 is an elevation plan view of an embodiment of a container transfer system in accordance with the present invention; and FIG. 2 is a side view of the container transfer system of FIG. 1

While a description will hereinafter be provided in connection with the illustrated embodiments and certain potentially preferred procedures, it is to be understood and appreciated that in no event is the invention to be limited to such embodiments and procedures as may be illustrated and described herein. On the contrary, it is intended that the present invention shall extend to all alternatives and modifications as may embrace the broad principles of this invention within the true spirit and scope thereof.

DESCRIPTION OF PREFERRED EMBODIMENT

Turning now to the drawings, wherein like elements are denoted by like reference numerals in the various views, in FIGS. 1 and 2 there is shown a transfer system 10 for transferring a multiplicity of open filled containers 12 across the interface between a first conveyor belt 14 and a second conveyor belt 16. As illustrated, the transfer system 10 may be mounted on a modular frame 20 which is bolted to any convenient support structure including a frame surrounding the upstream or downstream conveyor belts. It is also contemplated that the transfer system may be a substantially free standing unit that can be set up in place between two conveyors as desired.

Regardless of the support structure utilized, the transfer system 10 preferably includes a pair of opposing lateral grip chain structures 24 of substantially open construction oriented in a substantially upright position so as to cooperatively engage the lateral sides of the containers 12. As will be appreciated, the term "chain structure" is meant to include any construction of engaged link elements arranged in a pliable sheet form. In the illustrated and potentially preferred arrangement the lateral grip chain structures are each arranged around a pair of substantially vertical drive elements 26, 28 such as rollers or the like that cooperatively engage the chain structures as they are driven in a continuous circuit. In the illustrated and potentially preferred arrangement the drive elements 28 at one end of the chain circuit include an arrangement of sprockets 29 having an array of outwardly projecting teeth for engaging the interstices of the lateral grip chain structures. While the illustrated embodiment uses three sprockets 29 spaced along the length of each of the drive elements 28, such an arrangement is exemplary only and virtually any other arrangement as may be desired may likewise be utilized.

Adjustable drive motors 30 may be used to impart movement to the lateral grip chains 24. In practice, the lateral grip chains 24 are rotated in opposite directions relative to one another with one operating in a clockwise direction and the other in a counter-clockwise direction so as to cause the containers 12 to be cooperatively grasped and pulled through the transfer system 10. The rate of rotation of the lateral grip chains is preferably substantially equivalent to the rate of travel of the first and second conveyor belts 14, 16 so as to facilitate smooth transition at the inlet and outlet.

In practice, it is contemplated that the lateral grip chains may be of relatively light-weight open construction structures of metal having a rubberized coating of substantially non-abrasive material with a high coefficient of friction relative to the material forming the containers 12. By way of example only, such materials may include rubbers, plastics, latex and the like. The rubberized coating may have virtually any form as may be desired provided that the lateral grip chains maintain substantial flexibility. In this regard, the rubberized coating will preferably be disposed on the solid surfaces of the lateral grip chains without substantially blocking interstitial voids that cooperatively engage the drive elements 26, 28. If desired, the rubberized coating may define an arrangement of protruding structures such as bumps, ridges, nodules or the like so as to increase the surface area contacting the containers.

The lateral grip chains 24 are preferably maintained under a relatively light tension between the drive elements 26, 28 so as to allow localized concave deformation partially around the containers 12 so as to cup the sides of the containers 12 as they move through the system. The chain structure facilitates this cupping action since localized zones along the length of the grip chains can deform substantially independently from other zones. Moreover, the concave deformation can progressively move with the containers along the length of the grip chains. Thus, variable diameter containers may be readily accepted. In the illustrated and potentially preferred arrangement lateral grip chains 24 may be supported along their edges at least partially along the length between the drive elements 26, 28 by underlying support plates 31. Such support plates 31 provide a base for the lateral grip chains 24 and thus help to prevent sagging despite the low tensions which are utilized. That is, the lateral grip chains 24 can remain erect even if they are not stretched tightly between the drive elements 26, 28. This differs from traditional belt structures such as coated fabric and the like that must be stretched tightly in order to avoid collapse.

The use of chain structures to effect lateral gripping may provide several benefits. In particular, the integral stability of a chain structure facilitates the use of wide structures that are substantially self-supporting such that they do not collapse when they are placed on edge adjacent the containers 12 as shown in FIG. 2. In the potentially preferred construction utilizing sprocket drives, additional stability may be provided by the intermeshing arrangement between the chain and the sprocket drives. As will be appreciated, the use of a wide chain structure permits the system to be readily adaptable to containers of a wide range of sizes without requiring any height adjustment. The chain structure also aids in the use of rubberized coatings. In particular, since the chain structure bends at discrete, well defined linkage positions, the use of a chain structure permits coatings to be applied at discrete zones along the chain with intentional interruptions corresponding to those linkage positions. Thus, as the chain structure moves around the drive elements 26, 28, the coating experiences relatively minor bending forces. Accordingly, any propensity for cracking is greatly reduced.

In order to facilitate proper transfer, it is desirable that the containers 12 be substantially aligned with the nip opening formed by the lateral grip chains 24 as the lateral grip chains are engaged. To promote desired alignment, the illustrated embodiment utilizes a pair of converging rail elements 32 such as Teflon strips or the like that narrow the width of the conveyance path upstream of the transfer system 10. The rail elements 32 terminate in substantially opposing relation to a pair of angled guides 34 affixed on either side of the inlet to the transfer system 10. Upon passing between the angled guides 34, the containers 12 are in substantial alignment with the nip opening between the lateral grip chains 24.

According to a potentially preferred practice, the spacing between the lateral grip chains is preferably adjustable to different widths so as to be adaptable to containers of different diameter. As best illustrated in FIG. 1, in the illustrated embodiment such adjustment is carried out by a turnbuckle assembly 38 that adjusts the spread between the lateral grip chains 24 by providing equivalent movement to both sides in a manner as will be well known to those of skill in the art. Thus, virtually any size container may be accommodated. According to the illustrated and potentially preferred arrangement, a single centrally disposed turnbuckle assembly 38 is utilized. Such central adjustment is facilitated by the structural stability of the chain assemblies as previously described.

In actual practice, after the desired width is set between the lateral grip chains 24, the open containers 12 are delivered along the first conveyor belt 14 between the rail elements 32 so as to assume a substantially single file arrangement. The individual containers 12 then engage the angled guides 34 and are passed into the nip between the lateral grip chains 24. In the illustrated and potentially preferred practice, the containers 12 are engaged by the lateral grip chains 24 at a position before the first conveyor belt terminates while the containers are on a substantially level support surface. Once the containers 12 are engaged, they are conveyed across the space between the first conveyor belt 14 and the second conveyor belt 16. During this transfer the containers may maintain a degree of contact with the underlying belts but they are prevented from tipping by the support and/or friction resistance provided by the lateral grip chains 24. The containers 12 are thereafter deposited onto the second conveyor belt 16 at a position sufficiently downstream of the intersection such that a stable underlying support surface is provided.

It is to be understood that while the present invention has been illustrated and described in relation to potentially preferred embodiments, constructions, and procedures, that such embodiments, constructions, and procedures are illustrative only and that the invention is in no event to be limited thereto. Rather, it is contemplated that modifications and variations embodying the principles of the invention will no doubt occur to those of ordinary skill in the art. It is therefore contemplated and intended that the present invention shall extend to all such modifications and variations as may incorporate the broad aspects of the invention within the true spirit and scope thereof.

What is claimed is:

1. A transfer system for transporting an open container from a first conveyor to a second conveyor without spillage, wherein the transfer system comprises a pair of substantially vertically disposed opposing lateral grip chains rotating in opposite directions and defining a nip opening for acceptance of the container from the first conveyor and transference of the container to the second conveyor and wherein the lateral grip chains are coated with a friction enhancing composition and are adapted to conform at least partially around the container by localized concave deformation during transference, wherein each of the lateral grip chains has an arrangement of open interstices across its surface.

2. The invention as recited in claim 1, wherein each of the lateral grip chains is disposed in an endless loop arrangement around substantially vertically disposed drive elements.

3. The invention as recited in claim 2, wherein at least one vertically disposed drive element engaging each of said lateral grip chains includes an arrangement of protruding teeth adapted to engage open interstices of the lateral grip chains.

4. The invention as recited in claim 3, wherein said protruding teeth project outwardly from sprockets disposed in spaced apart relation along said at least one vertically disposed drive element.

5. The invention as recited in claim 3, further comprising support plates disposed in underlying relation to each of the lateral grip chains along the path between the vertically disposed drive elements.

6. The invention as recited in claim 3, further comprising a pair of guide rails disposed along the first conveyor, wherein said guide rails are arranged in converging relation to one another to define a narrowed chute opening at the exit of the exit of the first conveyor.

7. The invention as recited in claim 3, wherein the friction enhancing composition is a rubberized coating composition having raised surface protrusions.

8. A transfer system for transporting an open container from a first conveyor to a second conveyor without spillage, wherein the transfer system comprises a pair of substantially vertically disposed opposing lateral grip chains rotating in opposite directions and defining a nip opening for acceptance of the container from the first conveyor and transference of the container to the second conveyor and wherein the lateral grip chains are coated with a friction enhancing composition and are adapted to conform at least partially around the container by localized concave deformation during transference, wherein each of the lateral grip chains has an arrangement of open interstices across its surface, each of the lateral grip chains being disposed in an endless loop arrangement around substantially vertically disposed drive elements, and wherein the friction enhancing composition is discontinuous along the length of the lateral grip chains such that at least a portion of zones defining linkage positions along the lateral grip chains are uncoated.

9. The invention as recited in claim 8, further comprising a single adjustment means for adjustment of lateral spacing between the lateral grip chains.

10. The invention as recited in claim 9, wherein at least one vertically disposed drive element engaging each of said lateral grip chains includes an arrangement of protruding teeth adapted to engage open interstices of the lateral grip chains.

11. The invention as recited in claim 10, wherein said protruding teeth project outwardly from sprockets disposed in spaced apart relation along said at least one vertically disposed drive element.

12. The invention as recited in claim 10, further comprising support plates disposed in underlying relation to each of the lateral grip chains along the path between the vertically disposed drive elements.

13. The invention as recited in claim 12, further comprising a pair of guide rails disposed along the first conveyor, wherein said guide rails are arranged in converging relation to one another to define a narrowed chute opening at the exit of the exit of the first conveyor.

14. The invention as recited in claim 8, wherein the friction enhancing composition is a rubberized coating composition having raised surface protrusions.

15. A transfer system for transporting an open container from a first conveyor to a second conveyor without spillage, wherein the transfer system comprises a pair of substantially vertically disposed opposing lateral grip chains rotating in opposite directions and defining a nip opening for acceptance of the container from the first conveyor and transference of the container to the second conveyor and wherein the lateral grip chains are coated with a friction enhancing composition and are adapted to conform at least partially around the container by localized concave deformation during transference, wherein each of the lateral grip chains has an arrangement of open interstices across its surface, each of the lateral grip chains being disposed in an endless loop arrangement around substantially vertically disposed drive elements, and wherein the transfer system further comprises an adjustment assembly comprising a turnbuckle assembly for adjustment of lateral spacing between the lateral grip chains.

\* \* \* \* \*